United States Patent
Tosaka et al.

(10) Patent No.: US 7,644,978 B2
(45) Date of Patent: Jan. 12, 2010

(54) VEHICLE FLOOR STRUCTURE FOR A MOTOR VEHICLE

(75) Inventors: Yasuhiro Tosaka, Novi, MI (US); Nobuyoshi Suzuki, Isehara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 9 days.

(21) Appl. No.: 12/145,955

(22) Filed: Jun. 25, 2008

(65) Prior Publication Data

US 2009/0066118 A1    Mar. 12, 2009

(30) Foreign Application Priority Data

Jul. 6, 2007    (JP) .............................. 2007-178399

(51) Int. Cl.
*B62D 21/15*    (2006.01)
*B62D 25/20*    (2006.01)

(52) U.S. Cl. .............................. 296/187.12; 296/187.08; 296/193.05; 296/193.07; 296/209; 296/204; 296/30

(58) Field of Classification Search ............ 296/187.08, 296/187.12, 193.05, 193.06, 193.07, 203.03, 296/209, 30, 204
See application file for complete search history.

(56) References Cited

U.S. PATENT DOCUMENTS

| | | | | |
|---|---|---|---|---|
| 4,514,008 A | * | 4/1985 | Watanabe et al. ............ 296/204 |
| 6,382,710 B1 | * | 5/2002 | Funk et al. ............. 296/187.12 |
| 6,517,142 B2 | * | 2/2003 | Gehringhoff et al. ..... 296/146.6 |
| 6,540,286 B2 | * | 4/2003 | Takemoto et al. ........... 296/204 |
| 6,666,501 B1 | * | 12/2003 | Logan et al. ........... 296/193.07 |
| 7,434,871 B2 | * | 10/2008 | Mizuma et al. ......... 296/193.07 |
| 7,500,714 B2 | * | 3/2009 | Abe et al. .............. 296/193.07 |
| 2002/0153749 A1 | * | 10/2002 | Lee .............................. 296/204 |
| 2005/0082877 A1 | * | 4/2005 | Gotou et al. ................. 296/204 |
| 2007/0063543 A1 | * | 3/2007 | Roccato et al. ........ 296/187.08 |
| 2009/0102238 A1 | * | 4/2009 | Gomi ..................... 296/193.07 |
| 2009/0134667 A1 | * | 5/2009 | Tasumi et al. .......... 296/193.07 |
| 2009/0174220 A1 | * | 7/2009 | Guo ....................... 296/187.12 |

FOREIGN PATENT DOCUMENTS

| | | |
|---|---|---|
| EP | 0 937 630 A2 | 8/1999 |
| EP | 1 382 514 A1 | 1/2004 |
| JP | 08-080874 A | 3/1996 |

* cited by examiner

*Primary Examiner*—Jason S Morrow
(74) *Attorney, Agent, or Firm*—Foley & Lardner LLP

(57) ABSTRACT

A cross member passes a longitudinal member. The cross member is connected, on its outer end, to a side sill assembly and includes a connecting portion that divides the cross member into a remote cross member portion from the outer end of the cross member, and the other cross member portion. A reinforcement element extends through the connecting portion into the remote cross member portion and terminates in at its inner end spaced by a gap from a top wall of the longitudinal member, and it extends into the other cross member portion and terminates in at its outer end in the neighborhood of the side sill assembly. It is connected to an upper inner wall of the remote cross member portion, but spaced from an upper inner wall of the other cross member portion.

9 Claims, 5 Drawing Sheets

VEHICLE FLOOR STRUCTURE FOR A MOTOR VEHICLE

The present application claims the priority of Japanese Patent Application No. 2007-178399, filed Jul. 6, 2007, the disclosure of which is hereby incorporated by reference in its entirety.

BACKGROUND OF THE INVENTION

1. Field of the Invention

The present invention relates to a vehicle floor structure for a motor vehicle.

2. Background Art

JP-A 8-80874 (now JP Pat. No. 3381404) discloses a vehicle with a seat cross member, which is connected to a longitudinal floor beam, for example, a floor side sill assembly, on each side of the vehicle, and a center tunnel. Each of the seat cross members includes a recessed portion between an outer end side portion and an inner end side portion. The recessed portion and the outer end side portion are connected by a connecting portion. The connecting portion includes a ramp between top walls of the recessed portion and the outer end side portion. The top wall of the recessed portion is lower in height than the top wall of the outer end side portion.

An object of the present invention is to provide a vehicle floor structure with a seat cross member in a floor which is stable but which guarantees optimal deforming and/or bending properties to absorb the impact load in the event of a side collision.

SUMMARY OF THE INVENTION

According to one aspect of the present invention, there is provided a vehicle floor structure for a motor vehicle, comprising:

a side sill assembly on each side of the vehicle;

a longitudinal member;

a cross member passing, on a predetermined portion between outer and inner ends thereof, the longitudinal member and providing a gap above the longitudinal member, the cross member being connected, on an outer end thereof, to the side sill assembly, the cross member including, between the longitudinal member and the side sill assembly, a connecting portion that divides the cross member into two cross member portions and connects the two cross member portions together, the two cross member portions including a remote cross member portion from the outer end of the cross member and the other cross member portion; and a reinforcement element extending through the connecting portion into the remote cross member portion and terminating in at an inner end thereof spaced above from a top wall of the longitudinal member, the reinforcement element being connected to an upper inner wall of the remote cross member portion to reinforce same, the reinforcement element extending into the other cross member portion and terminating in at an outer end thereof in the neighborhood of the side sill assembly, the reinforcement element being spaced from an upper inner wall of the other cross member portion.

DETAILED DESCRIPTION OF THE INVENTION

Initially it is noted that the drawings referred to hereinafter as illustrating the preferred embodiment of the present invention are not to scale and are schematic in nature and, therefore, should not be taken too literally. Nevertheless, the drawings illustrate the invention sufficiently to enable one skilled in the art to practice the invention.

Figure 1:
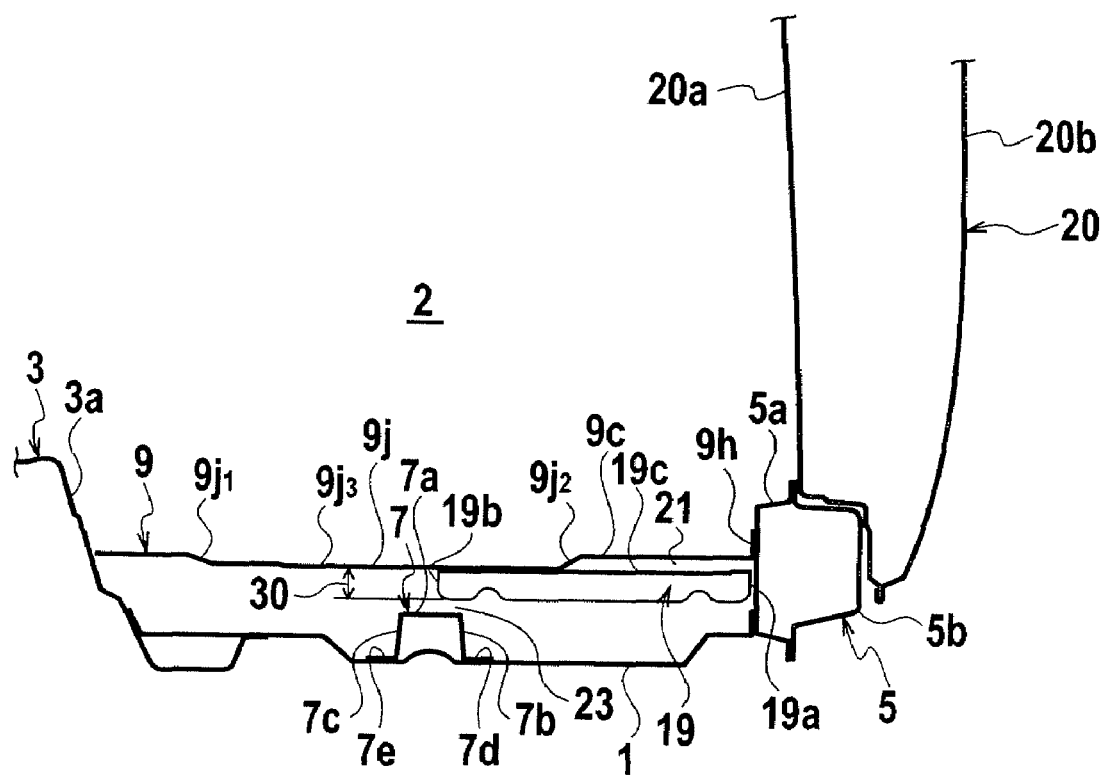
FIG. 1 is a fragmentary section taken through the line I-I in FIG. 2 with a side sill assembly and a lateral load beam on the left side of a passenger car.
Figure 2:
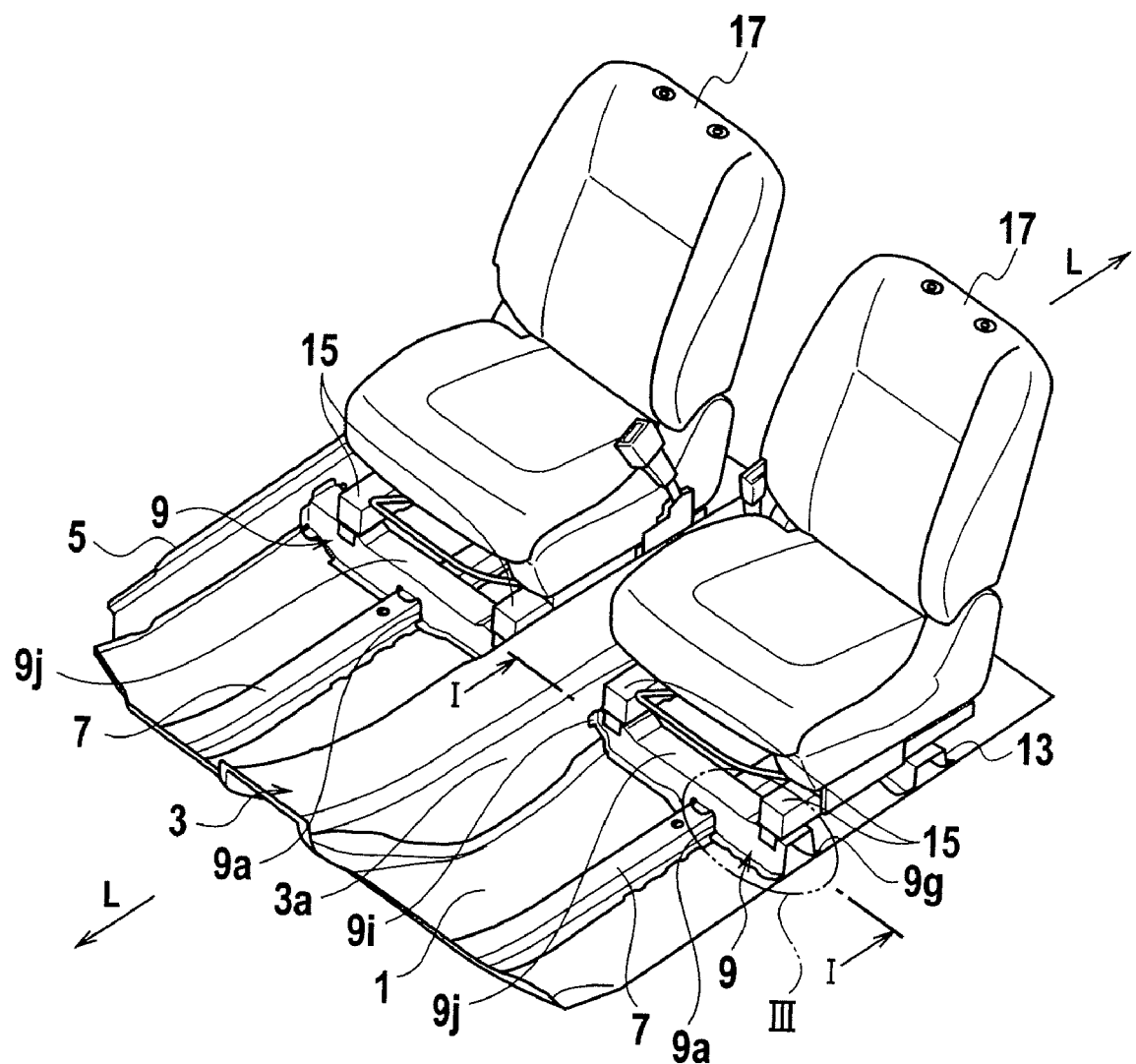
FIG. 2 is a fragmentary perspective view of a vehicle floor structure according to the present invention with two lateral load beams and a side sill assembly on the left side removed.
Figure 3:
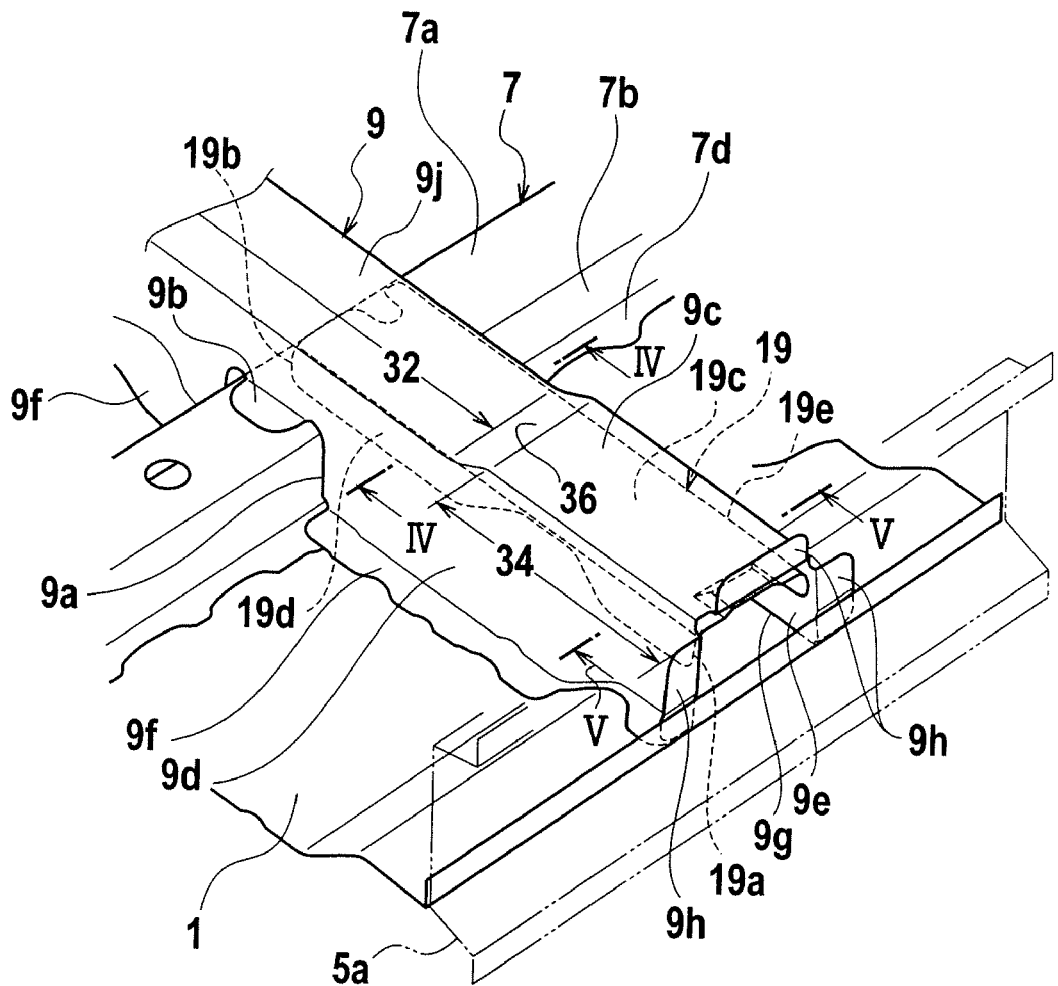
FIG. 3 is a magnified view of a portion enclosed by a circle III in FIG. 2 with an inner sill of the side sill assembly on the left side of the passenger car.

FIG. 2 in conjunction with FIGS. 1 and 3 shows a vehicle floor structure of a vehicle, of which only the center section in the region of two seat cross members 9, 9 is shown. The vehicle floor structure comprises two longitudinal members 7, 7, a center tunnel 3 in a floor panel 1 and two side sill assemblies 5, 5. Only a portion of a right one of the two side sill assemblies 5, 5 is shown in FIG. 2. A portion of a left one of the two side sill assemblies 5, 5 is shown in FIG. 1. The center tunnel 3 protrudes toward a passenger compartment 2 and runs or extends along the vehicle longitudinal center axis L-L (see FIG. 2). The center tunnel 3 holds the cross members 9, 9 so that they function as a single cross member between the two side sill assemblies 5, 5.

Disposed on the floor panel 1 between the right side sill assembly 5 and the center tunnel 3 is a right longitudinal member 7 that extends generally along the vehicle longitudinal center axis L-L. Disposed on the floor panel 1 between the left side sill assembly 5 and the center tunnel 3 is a left longitudinal member 7 that extends generally along the vehicle longitudinal center axis L-L. In the embodiment, the longitudinal members 7, 7 are rear extensions of two front side members, not shown, that extend rearwards from the front of the vehicle. Thus, the longitudinal members 7, 7 may be called front side member rear extensions.

Each of the longitudinal members 7, 7 has a top wall 7a, two bent down side walls 7b, 7c from side edges of the top wall 7a, and downwardly facing laterally bent flanges 7d, 7e from bottom edges of the side walls 7b, 7c. The flanges 7d, 7e are fixedly connected to the floor panel 1. In other words, each of the longitudinal members 7, 7 has downwardly facing bent down legs 7b, 7d, and 7c, 7e connected to the floor panel 1.

Interposing the center tunnel 3, the two cross members 9, 9 of right and left are connected to the floor panel 1 on the right and left sides of the center tunnel 3. Stepping over the respective longitudinal members 7, 7, the cross members 9, 9 extend in the vehicle width direction. In other words, crossing the respective longitudinal members 7, 7, the cross members 9, 9 extend in the vehicle width direction.

As best seen in FIG. 3, the cross member 9 passes, on a predetermined portion between outer and inner ends thereof, the longitudinal member 7. To avoid interference contact with the longitudinal member 7, the predetermined portion of the cross member 9 is cut upwardly from below to form a tunnel opening 9a that allows the passage of the longitudinal member 7. The cross member 9 has two flanges 9b extending along the vehicle longitudinal center axis L-L in the opposite directions from above the tunnel opening 9a. In FIG. 3, only a front one 9b of the flanges is shown, but a rear one of the flanges is not shown. The front and rear flanges 9b are fixedly connected to a top wall 7a of the longitudinal member 7.

Each of the cross members 9, 9 has a top wall 9c, two bent down side walls 9d, 9e from side edges of the top wall 9c, and downwardly facing bent flanges 9f, 9g (see FIG. 8) from bottom edges of the side walls 9d, 9e. The flanges 9f, 9g are fixedly connected to the floor panel 1. In other words, each of the cross members 9, 9 has downwardly facing bent down legs 9d, 9f, and 9e, 9g connected to the floor panel 1.

As shown in FIG. 1, at its outer end, each of the cross members 9, 9 has a flange 9h fixedly connected to a sill inner 5a of one of the side sill assemblies 5. At its inner end, each of the cross members 9, 9 has a flange 9i (see FIG. 2) fixedly connected to one of side walls 3a of the center tunnel 3. The side walls 3a slope downwards.

The top wall 9c of each of cross member 9 is recessed at a predetermined area between the center tunnel 3 and the side sill assembly 5 to provide a recessed section 9j. The recessed section 9j of the top wall 9c is a flat top wall section 9j3. The flat top wall section 9j3 is lower in height than the two remaining sections of the top wall 9c which are not recessed. An inner one of the two remaining sections of the top wall 9c which are not recessed extends inwards from the inner end of the cross member 9 and connects into the recessed section 9j of the top wall 9c by way of an inner connecting portion 9j1, and an outer one thereof extends inwards from the outer end of the cross member 9 and connects into the recessed section 9j of the top wall 9c by way of an outer connecting portion 9j2. The inner connecting portion 9j1 includes a ramp between the top wall of the inner section of the top wall 9c which is not recessed and the flat top wall section 9j3 of the recessed section 9j. This ramp slopes downwards toward the flat top wall section 9j3 in a direction from the center tunnel 3 toward the side sill assembly 5. The outer connecting portion 9j2 includes a ramp between the top wall of the outer section of the top wall 9c which is not recessed and the flat top wall section 9j3 of the recessed section 9j. This ramp slopes downwards toward the flat top wall section 9j3 in a direction from the side sill assembly 5 toward the center tunnel 3. The inner connecting portion 9j1 is located between the longitudinal member 7 and the center tunnel 3, and the outer connecting portion is located between the longitudinal member 7 and the side sill assembly 5.

From the above description, it is noted that the cross member 9 includes, between the longitudinal member 7 and the side sill assembly 5, the outer connecting portion 9j2 that divides the cross member 9 into two cross member portions (see FIG. 3). The two cross member portions include the remote cross member portion 32 from the outer end of the cross member 9 connected to the side sill assembly 5. This cross member portion 32 carries the top flat wall 9j3 of the recessed section 9j. The two cross member portions include the other cross member portion 34 adjacent to the side sill assembly 5. This cross member portion 34 carries the top wall 9c of the outer one of those remaining sections which are not recessed. The outer connecting portion 9j2 connects the remote cross member portion 32 and the other cross member portion 34 together.

Forming each cross member 9 with the above-mentioned recessed section 9j provides increased space under the associated one of seats 17 (see FIG. 2). Referring also to FIG. 3, the flat top wall section 9j3 of the remote cross member portion 32 is lower in height than the top wall of the other cross member portion 34. Because the ramp 36 slopes downwards toward the flat top wall section 9j3 in the direction from the side sill assembly 5 toward the center tunnel 3, the connecting portion 9j2 provides a transition in cross sectional profile between the different cross sectional profiles of the two cross member portions 32 and 34.

Referring to FIG. 2, arranged behind, with respect to the vehicle longitudinal axis L-L, each cross member 9 is another cross member 13. The associated seat 17 is installed via a seat slide mechanism 15 on the sections of the top wall 9c which are not recessed of the cross member and a top wall of the cross member 13.

Figure 4:
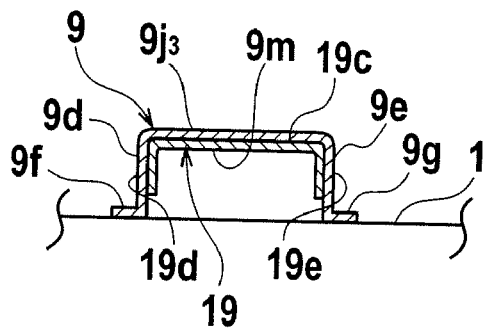
FIG. 4 is a fragmentary section taken through the line IV-IV in FIG. 3.
Figure 5:
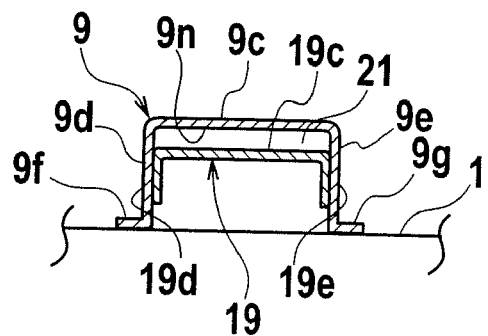
FIG. 5 is a fragmentary section taken through the line V-V in FIG. 3.

Referring to FIGS. 1, 3, 4 and 5, each cross member 9 is reinforced by an internal reinforcement element 19. The reinforcement element 19, within each cross member 9, extends through the connecting portion 9j2 into the remote cross member portion 32 and terminating in at its inner end 19b spaced by a gap 23 from a top wall 7a of the longitudinal member 7. As best seen in FIG. 4, the reinforcement element 19 is connected, on its top wall 19c, to an upper inner wall 9m of the remote cross member portion 32 to reinforce same. The reinforcement element 19 extends into the other cross member portion 34 and terminating in at its outer end 19a in the neighborhood of the side sill assembly 5 (see FIG. 1). As best seen in FIG. 5, the reinforcement element 19 is spaced from an upper inner wall 9n of the other cross member portion 34 to provide a gap 21.

Turning back to FIG. 1, at that portion of the side sill assembly 5 which is connected by the cross member 9, a center pillar (or a B-pillar) 20 extends upwardly from the side sill assembly 5. The center pillar 20 includes a pillar inner 20a and a pillar outer 20b. At its lower end portion, the pillar inner 20a is fixedly connected to a sill outer 5b of the side sill assembly 5. The cross member 9 and the center pillar 20 lie in the common transverse plane with respect to the longitudinal center axis L-L (see FIG. 2) of the vehicle.

The reinforcement element 19 forms the gap 21 with the upper inner wall 9n of the other cross member portion 34 of the cross member 9 in approximately half of its entire length on the side of the outer end 19a, that is, the outer side of the connecting portion 9j2. Thus, the reinforcement element 19 has its outer end 19a disposed adjacent to the side sill assembly 5 and its top wall 19c spaced from the upper inner wall 9n of the cross member 9 on the side of its outer end 19a.

The reinforcement element 19 forms a gap 23 (see FIG. 1) with the top wall 7a of the longitudinal member 7 on the side of the inner end 19b, that is, the inner side of the connecting portion 9j2. This means that the reinforcement element 19 has its inner end 19b spaced by a gap 23 from the top wall 7a of the longitudinal member 7.

As is seen from FIGS. 4 and 5, the reinforcement element 19 has a cross sectional profile of a vertically inversed U and includes bent down side walls 19d and 19e from the top wall 19c.

Thus, the reinforcement element 19 has its top wall 19c fixedly connected to the upper inner wall 9m on the opposite side of the flat top wall section 9j3 on the inner side near the longitudinal member 7, that is, the inner side of the connecting portion 9j2. This means that the top wall 19c of the portion of the reinforcement element 19 on the side of the inner end 19b is fixedly connected to the upper inner wall 9m of the cross member 9 on the opposite side of the flat top wall 9j3.

Figure 6:
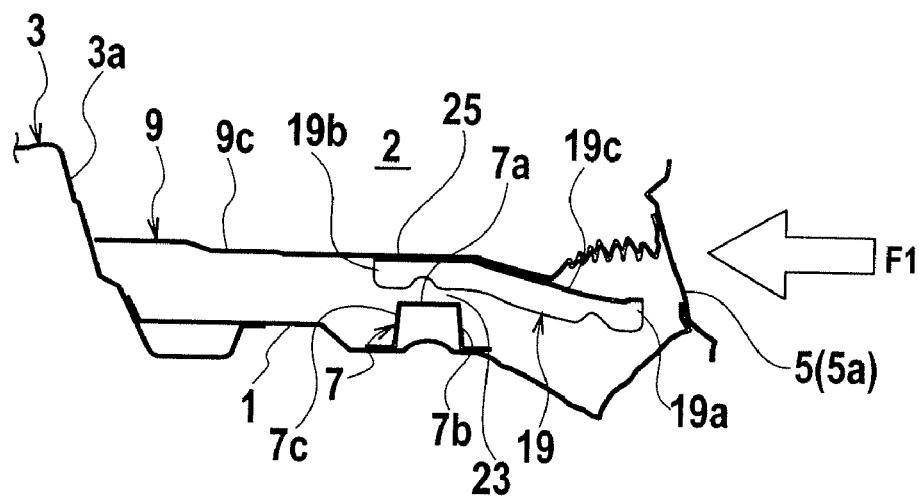
FIG. 6 schematically illustrates the state that the cross member is stable enough, but has a predefined portion which is compressed and broken in a longitudinal direction when the cross member is stressed in the longitudinal direction by a side impact load in the event of a side collision.

As shown in FIG. 6, a lower side impact load in the direction F1 of the arrow is applied to the side sill assembly 5 adjacent to the bottom end of the center pillar 20 in the event of a side collision. Smashing the bottom end of the center pillar 20 and the side sill assembly 5, the lower impact load F1 acts on the cross member 9 and the reinforcement element 19 in their longitudinal direction. In FIG. 6, the illustration of the center pillar 20 and the sill outer 5b is hereby omitted.

The cross member 9 is reinforced by the reinforcement element 19 to maintain the required setting level of strength. The cross member 9 and the reinforcement element 19 are spaced from each other to form the gap 21 on that portion which is disposed on the side of the side sill assembly 5. Thus, the strength of that cross member portion 34 of the cross member 9 which is spaced from the reinforcement element 19 does not rise too much so that the cross member portion 34 is compressed and broken in the longitudinal direction efficiently to absorb the impact energy.

It is noted that the cross member 9 is stable enough, but has the cross member portion 34 which is compressed and broken in a longitudinal direction when the cross member 9 is stressed in the longitudinal direction by the lower side impact load F1 to absorb the impact energy in the event of a side collision.

Figure 7:
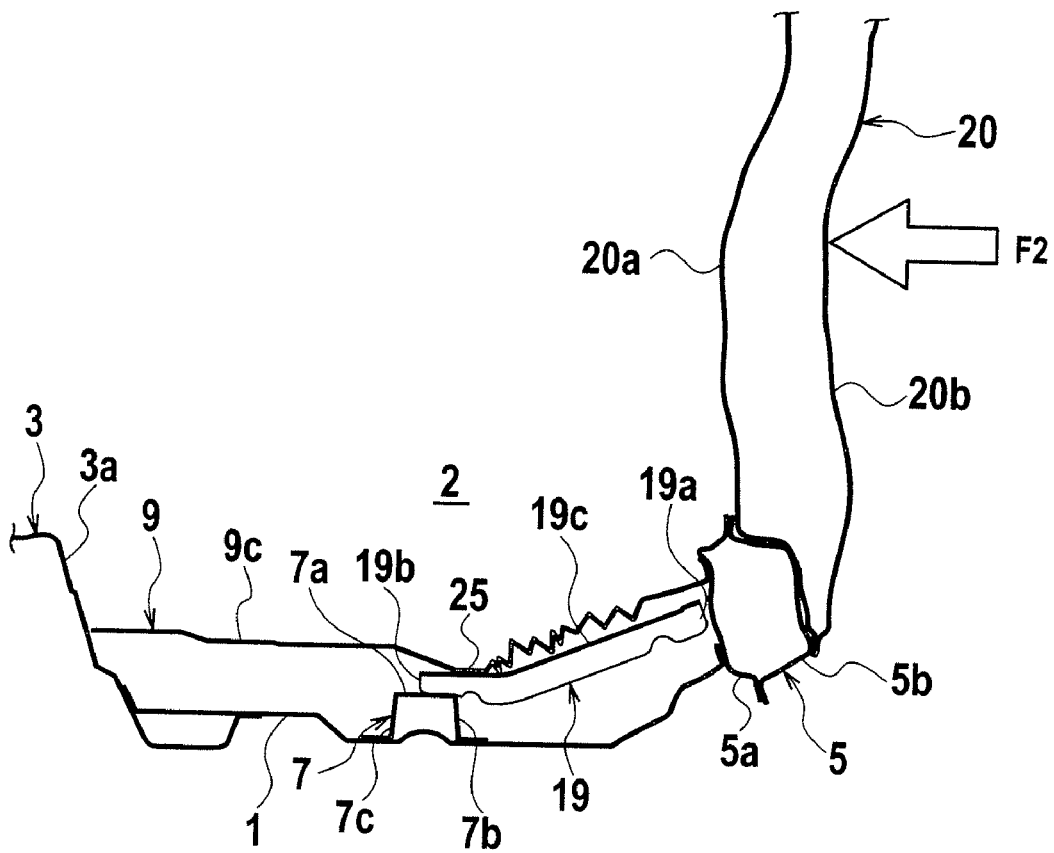
FIG. 7 schematically illustrates the state that a shape-locking connection is created to secure a space within a passenger compartment in the event of a side collision.

As shown in FIG. 7, an upper side impact load in the direction F2 of the arrow is applied to the center pillar 20 at a portion above the side sill assembly 5 in the event of a side collision. The cross member 9 and the reinforcement element 19 are deformed and bent on that zone 25 where the cross member 9 and the reinforcement element 19 are fixedly connected to each other so that the portions of the cross member 9 and the reinforcement element 19 on the side of the side sill assembly 5 move upwardly, thereby to absorb the impact energy.

The above-mentioned deformation and bending continue until the gap 23 disappears, that is, the reinforcement element 19 contacts with the top wall 7a of the longitudinal member 7. After the deformation and bending, the inner end 19b or its adjacent portion contacts with the top wall 7a to suppress further deformation and bending, thus securing a space within the passenger compartment 3 in the event of a side collision.

It is noted that the cross member 9 and the reinforcement element 19 are bent and deformed on that portion where the reinforcement element 19 is fixedly connected to the cross member 9 in such a direction to allow an upward movement of the side sill assembly 5 until the inner end 19b of the reinforcement element 19 contacts with the top wall 7a of the longitudinal member 7 when the cross member 9 is stressed in a rotational direction by the upper impact load F2 applied to the center pillar 20 above the side sill assembly 5 in the event of a side collision. Because further deformation and bending of the cross member 9 and the reinforcement element 19 end after the inner end 19b of the reinforcement element 19 contacts with the top wall 7a of the longitudinal member 7, a shape-locking connection is created to secure a space within the passenger compartment 2 in the event of a side collision.

In the embodiment, the cross member 9 is located under the passenger compartment 2 as high as the longitudinal member 7, which is a rear extension of a front side member, and the cross member 9 and the center pillar 20 lie in the common transverse plane with respect the vehicle longitudinal center axis L-L. Thus, a space within the passenger compartment 2 is secured in the event of a side collision where the upper impact load F2 is applied to the center pillar 20.

Figure 8:
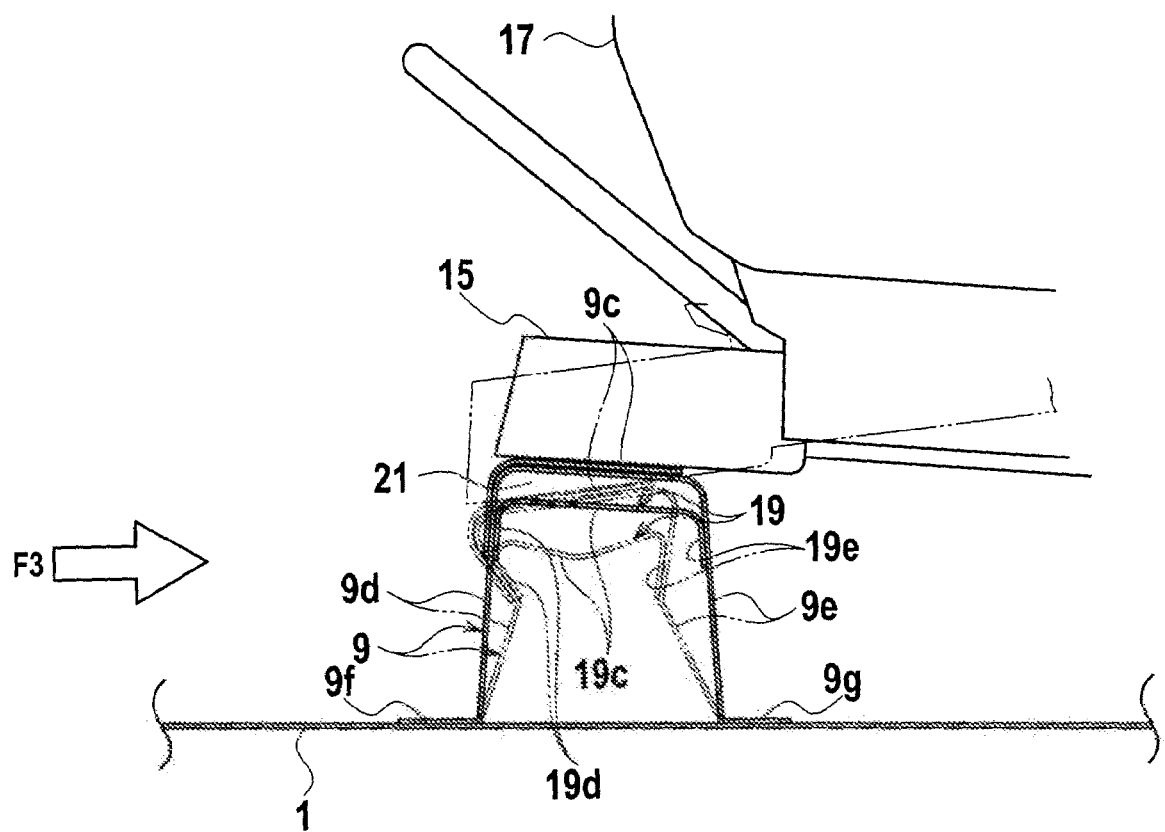
FIG. 8 schematically illustrates the state that a reinforcement element bears load to restrain deformation of the cross member to suppress movement of the associated seat in the vehicle longitudinal center axis in the event of a front end collision.

As shown in FIG. 8, in the event of a front end collision, an impact load F3 is applied. In this case, the reinforcement element 19 is stiff enough to bear the load to restrain the deformation of the cross member 9. This suppresses the movement of the seat 17 along the vehicle longitudinal axis L-L (see FIG. 3) in the event of a front end collision.

While the preferred embodiment of the present invention has been described with particularly herein, it is considered apparent that the present invention is capable of numerous modifications, replacements, and substitutions of parts and, therefore, is not to be limited. Rather, the present invention is only to be defined by the claims appended hereto, including equivalents thereof.

The invention claimed is:

1. A vehicle floor structure for a motor vehicle, comprising:
a side sill assembly on each side of the vehicle;
a longitudinal member;
a cross member passing, on a predetermined portion between outer and inner ends thereof, the longitudinal member and providing a gap above the longitudinal member,
the cross member being connected, on an outer end thereof, to the side sill assembly,
the cross member including, between the longitudinal member and the side sill assembly, a connecting portion that divides the cross member into two cross member portions and connects the two cross member portions together, the two cross member portions including a remote cross member portion from the outer end of the cross member and the other cross member portion; and
a reinforcement element extending through the connecting portion into the remote cross member portion and terminating in at an inner end thereof spaced above from a top wall of the longitudinal member, the reinforcement element being connected to an upper inner wall of the remote cross member portion to reinforce same, the reinforcement element extending into the other cross member portion and terminating in at an outer end thereof in the neighborhood of the side sill assembly, the reinforcement element being spaced from an upper inner wall of the other cross member portion.

2. The vehicle floor structure as claimed in claim 1, wherein a top wall of the remote cross member portion is lower in height than a top wall of the other cross member portion, and the connecting portion includes a ramp between the top walls of the two cross member portions.

3. The vehicle floor structure as claimed in claim 1, wherein the longitudinal member and the cross member are disposed under a passenger compartment of the vehicle.

4. The vehicle floor structure as claimed in claim 3, wherein the cross member and a center pillar lie in the common transverse plane with respect to a longitudinal center axis of the vehicle.

5. The vehicle floor structure as claimed in claim 1, wherein the cross member is a seat cross member.

6. The vehicle floor structure as claimed in claim 1, wherein the cross member is connected, on the inner end, to a center tunnel of the vehicle.

7. The vehicle floor structure as claimed in claim 1, wherein the cross member is stable enough, but has a predefined portion which is compressed and broken in a longitudinal direction when the cross member is stressed in the longitudinal direction by a lower side impact load which is applied to the side sill assembly in the event of a side collision.

8. The vehicle floor structure as claimed in claim 1, wherein the cross member and the reinforcement element are bent and deformed on that portion where the reinforcement element is fixedly connected to the cross member in such a direction to allow an upward movement of the side sill assembly until the inner end of the reinforcement element contacts with the top wall of the longitudinal member when the cross member is stressed in a rotational direction by an upper side impact load which is applied to above the side sill assembly in the event of a side collision, thereby creating a self-locking connection to secure a space within a passenger compartment of the vehicle.

9. The vehicle floor structure as claimed in claim 7, wherein the cross member and the reinforcement element are bent and deformed on that portion where the reinforcement element is fixedly connected to the cross member in such a direction to allow an upward movement of the side sill assembly until the inner end of the reinforcement element contacts with the top wall of the longitudinal member when the cross member is stressed in a rotational direction, thereby creating a self-locking connection to secure a space within a passenger compartment of the vehicle.

\* \* \* \* \*